United States Patent
Agramunt Ros et al.

(10) Patent No.: US 11,022,705 B2
(45) Date of Patent: Jun. 1, 2021

(54) SYSTEM AND METHOD FOR THE VOLUMETRIC AND ISOTOPIC IDENTIFICATION OF RADIATION DISTRIBUTION IN RADIOACTIVE SURROUNDINGS

(71) Applicants: CONSEJO SUPERIOR DE INVESTIGACIONES CIENTIFICAS (CSIC), Madrid (ES); UNIVERSITAT DE VALÈNCIA, Valencia (ES); EMPRESA NACIONAL DE RESIDUOS RADIOACTIVOS, S.A. (ENRESA), Madrid (ES)

(72) Inventors: Jorge Agramunt Ros, Paterna (ES); Francisco Albiol Colomer, Paterna (ES); Alberto Corbi Bellot, Paterna (ES); Luis Caballero Ontanaya, Paterna (ES); César Domingo Pardo, Paterna (ES); Alberto Albiol Colomer, Paterna (ES)

(73) Assignees: CONSEJO SUPERIOR DE INVESTIGACIONES CIENTIFICAS (CSIC), Madrid (ES); UNIVERSITÄT DE VALENCIA, Valencia (ES); EMPRESA NACIONAL DE RESIDUOS RADIOACTIVOS, S.A. (ENRESA), Madrid (ES)

( * ) Notice: Subject to any disclaimer, the term of this patent is extended or adjusted under 35 U.S.C. 154(b) by 73 days.

(21) Appl. No.: 16/484,956

(22) PCT Filed: Feb. 1, 2018

(86) PCT No.: PCT/ES2018/070074
§ 371 (c)(1),
(2) Date: Aug. 9, 2019

(87) PCT Pub. No.: WO2018/146358
PCT Pub. Date: Aug. 16, 2018

(65) Prior Publication Data
US 2020/0003915 A1 Jan. 2, 2020

(30) Foreign Application Priority Data
Feb. 10, 2017 (ES) .................................. 201730164

(51) Int. Cl.
*G01T 1/29* (2006.01)
*G01T 1/167* (2006.01)

(52) U.S. Cl.
CPC ............ *G01T 1/2935* (2013.01); *G01T 1/167* (2013.01)

(58) Field of Classification Search
CPC ....... G01T 1/2935; G01T 1/167; G01T 1/169; G01T 1/2907; G01T 7/00; G01V 5/02
See application file for complete search history.

(56) References Cited

U.S. PATENT DOCUMENTS 6,782,123 B1 * 8/2004 Guillon .................. G01C 11/06
250/336.1
8,606,349 B2 * 12/2013 Rousso .................. A61B 6/037
600/436

FOREIGN PATENT DOCUMENTS

| EP | 2796898 | 10/2014 |
| EP | 2966478 | 1/2016 |

(Continued)

OTHER PUBLICATIONS

Luis Caballero, "Gamma-ray imaging system for real-time measurements in nuclear waste characterisation", Article, 1-21.
"Intensity Gamma Camera" Article, Apr. 25, 2016, 1-6.

*Primary Examiner* — David P Porta
*Assistant Examiner* — Meenakshi S Sahu
(74) *Attorney, Agent, or Firm* — Hayes Soloway PC

(57) ABSTRACT

The present invention relates to a system (10) and method for the volumetric and isotopic identification of the spatial (Continued)

distribution of ionizing radiation from point or extensive radioactive sources (3) in radioactive surroundings. More specifically, this system (10) comprises a gamma radiation detector (2) and an optical transducer (1) joined to each other and linked to a control unit to detect the absolute position of radioactive sources (3) relative to a visual reference located in the radioactive surroundings, and to determine the radioactive activity of the sources, that is to say it detects the isotope composition of the radioactive sources (3).

10 Claims, 2 Drawing Sheets

(56) References Cited

FOREIGN PATENT DOCUMENTS

| | | |
|---|---|---|
| JP | 2014179720 | 9/2014 |
| KR | 101309826 | 10/2013 |
| WO | 2005022197 | 3/2005 |

\* cited by examiner

SYSTEM AND METHOD FOR THE VOLUMETRIC AND ISOTOPIC IDENTIFICATION OF RADIATION DISTRIBUTION IN RADIOACTIVE SURROUNDINGS

CROSS-REFERENCE TO RELATED APPLICATIONS AND PRIORITY

This patent application claims priority from PCT/ES2018/070074 filed Feb. 1, 2018, which claims priority from ESP201730164 filed Feb. 10, 2017. Each of these patent applications which are herein incorporated by reference in its/their entirety.

OBJECT OF THE INVENTION

The object of the present invention relates to a system and method for the volumetric and isotopic identification of the spatial distribution of ionising radiation from point or extensive radioactive sources in radioactive surroundings.

More specifically, this system and method detect the absolute position of radioactive sources relative to a visual reference located in the radioactive surroundings. It also determines the radioactive activity thereof and the composition of the isotopes of the mentioned sources.

BACKGROUND OF THE INVENTION

Currently, due to certain industrial activities for producing energy or managing and monitoring materials, there are environments which are potentially contaminated by radioactive material. This contamination is usually due to uncontrolled leakage of radioactive material from radioactive sources.

On the other hand, in relation to safety in nuclear installations, it is necessary to carry out active and preventive surveillance tasks, such as during the transportation of materials found therein or when control measures are implemented.

In all these scenarios, information must be obtained on what radioisotopes are present in said materials, in what amount and what their spatial distribution is.

Usually, gamma radiation detectors are used to detect said radiation, comprising transducers which produce an electrical signal when they are stimulated by the ionising radiation. This electrical signal is proportional to the energy of the radiation and is unique for each isotope, since it depends on the wavelengths present therein. The wavelength for which the greatest energy deposit occurs in the detector (absence of Compton radiation) is called a photopeak.

By determining these photopeaks, it is possible to characterise the contaminating elements of an environment and to know the composition of isotopes in one or several radiation sources.

In order to inspect an area contaminated with radiation, it is necessary to have gamma radiation detectors. An operator must usually move these detectors manually in order to locate the areas at risk, being inevitably exposed to the ionising radiation present. This type of sampling contributes to mapping contaminated spaces. In order to avoid these negative effects, there are different solutions which are summarised below and which are also able to perform a two-dimensional mapping of the radioactive sources.

An example of this solution appears in WO2005022197A2, wherein are described different methods and apparatuses for determining the intensity and location of a radioactive source in two dimensions. This locating is performed by means of a device comprising a matrix of at least 3 gamma radiation detectors positioned in different places of which the coordinates thereof are known. The operating area, or field of vision, of the gamma radiation detectors must be partially superimposed. When this device detects a dangerous source, it generates signals according to the intensity and location thereof. The device makes use of an algorithm which correlates the coordinates from the gamma radiation detectors with the signals generated by them. Despite these advantages, the aforementioned document does not describe how to locate and orient the detectors. Furthermore, the detection and locating capabilities are optimised for the position wherein the detectors were originally established. Finally, if the system is to be relocated, it is necessary to make a great deal of effort since it is not designed to be moved.

EP2966478A1 describes a three-dimensional radiation detection system connected to a visualisation system. This system comprises a radiation sensor and an image sensor coupled to a vertical rotation mechanism and a horizontal rotation mechanism. Additionally, it describes a three-dimensional radiation detection and visualisation method. Finally, the image, the detected radiation and the 3D position are related to each other. However, the described method is based on the visual inspection of the images provided continuously by both detectors. No precise identification of the actual position of the radioactive source is established and, therefore, it requires additional elements (such as a laser) in order to measure the real distance between the source and the detectors.

Another example relating video with radiation detectors is found in document U.S. Pat. No. 6,782,123B1. This describes a method and apparatus for accurately locating radioactive sources. This apparatus comprises a pair of visible-light cameras which are oriented in directions such that they have all or part of their field of vision in common. The apparatus also comprises a gamma radiation detector. Having multiple visible-light cameras makes three-dimensional identification possible through an initial triangulation. After moving the apparatus and by means of a second triangulation, the location of the radiation sources is identified. Additionally, this solution uses photogrammetry software to perform the calculations.

The drawback of this solution is that it requires the correct centering of the visible-light cameras and the gamma radiation detector. On the other hand, this method is not effective since it does not take into account the real differences in measurement between the light, the angular resolution of which is excellent, and the gamma radiation, which inherently has a much lower angular resolution. Another significant disadvantage is that in order to ensure good detection it is necessary to constantly be focused on a source which, in general, can have a low intensity. Finally, it does not allow sweeping movements to be carried out, rather that each scene acquired with the gamma detector is independent from the previous one, resulting in false negatives for certain locations.

Finally, EP2796898A1 describes a mobile vehicle equipped with radiation sensors which is able to measure the distribution of the radioactive intensity of the environment. Once this spatial distribution of intensities has been obtained, the position of the radioactive source is derived. However, this system cannot be used in enclosed spaces since it does not have means for locating the radioactive source and is completely focused on the general inspection of open spaces, such as disaster areas or large deposits of materials.

In summary, the aforementioned solutions involve devices and methods which merge visible images and gamma detection in the same framework. However, they do not enable results to be obtained which are completely consistent with reality. This is mainly due to the poor geometric interrelation between the gamma radiation detector devices and the visible-light cameras coupled or connected to them.

DESCRIPTION OF THE INVENTION

A first object of the invention is a system for the volumetric and isotopic identification of the spatial distribution of at least one ionising radiation from one or several points or extensive radioactive sources in radioactive surroundings wherein the system comprises:
- a gamma radiation detector, for generating an electrical signal proportional to the energy of the ionising radiation, and which comprises collimation mechanisms intended to obtain directional information from the radioactive surroundings, and
- an optical transducer joined to the gamma radiation detector for capturing images of the radioactive surroundings.

More specifically, the system comprises:
a control unit which links the gamma radiation detector to the optical transducer,
wherein the control unit comprises:
a microprocessor, and
a memory, linked to the microprocessor, and which comprises:
  positioning instructions for:
    defining an initial image of the radioactive surroundings captured by the optical transducer,
    detecting at least one visual reference in the initial image,
    determining the initial orientation of the gamma radiation detector with respect to said visual reference,
    detecting the absolute position of the system with respect to the visual reference of the initial image in a series of locations, starting from subsequent images after the initial image, and
    for determining the orientation of the gamma radiation detector for each location within the radioactive surroundings, and
  measurement instructions for:
    performing measurements of the ionising radiation, by means of the gamma radiation detector, in each location of the system within the radioactive surroundings,
    relating these measurements of the ionising radiation to the absolute position obtained by means of the positioning instructions,
    establishing the spatial distribution of the measurements of the ionising radiation in the radioactive surroundings forming a three-dimensional matrix with the shape of sub-volumes wherein each sub-volume region comprises a value proportional to the intensity of the radiation thereof, and
    characterising the ionising radiation according to the value of the electrical signal produced by the transducer according to the photopeaks in order to determine the isotope composition thereof.

The collimation mechanisms comprise a structure with segmenters for detecting the direction of the ionising radiation from the radioactive source in each location of the system. Furthermore, in order to detect the direction of the ionising radiation, the control unit incorporates instructions for calculating trajectories of the incident radiation, such as collimation techniques or Compton techniques.

More specifically, the structure with segmenters and/or collimation techniques, enable the control unit to obtain a three-dimensional cone-shaped measurement field of the ionising radiation starting from the information coming from the gamma radiation detector. As the gamma radiation detector is joined to the optical transducer, the control unit can relate the measurement field of the gamma radiation detector to a field of vision of the optical transducer. In this manner, it solves several of the aforementioned problems of the state of the art related to the disparity between the gamma radiation detector devices and the optical transducers as far as resolution and forms of calibration between them.

Starting from the measurements made by the gamma radiation detector in the different positions, the spatial distribution of the radioactive activity is obtained.

This radioactive activity is considered as the intensity factor of the gamma radiation detector, and is determined by means of the ability of the gamma radiation detector to associate each photopeak of each known energy with an acceptance value. Additionally, the relationship between the distance and the intensity of the radioactive source (which decreases with the square of the distance) enables the intensity of the radioactive source to be evaluated and the absolute position thereof to be determined with respect to the system or a visual reference.

The optical transducer is a visible-light camera, or a depth or contour camera.

The control unit comprises the projective features of the optical transducer, meaning the equation thereof and associated parameters, which enable the calibration thereof to be performed. The usual manner for obtaining this equation is by means of two matrices. The first matrix corresponds to the internal features of the aperture of the lens and the size of the optical sensor and which, unless the lens or the focal points are changed, is fixed. The second matrix corresponds to the internal translations. This calibration involves obtaining the equation of the optical transducer which in turn enables lines to be connected in the space with points in the image. This vision technique is also known as projective imaging.

Said control unit, through the images of the visual reference in the radioactive surroundings of the optical transducer, enables, in each measurement made by the gamma radiation detector, the relative position of the system to be obtained with respect to the previous positions thereof and enables the (unknown) location of the radiation source to be identified through subsequent measurements or movements of the system.

Preferably, the visual reference is a fiducial mark with pre-established dimensions, or size, and is positioned by a user in the radioactive surroundings within the field of vision of the optical transducer, such that when the latter takes the initial image the fiducial mark is comprised in said initial image. It should be noted that throughout the series of locations, and therefore measurements, this fiducial mark can be placed in another position, or overlap with other fiducial marks. In this manner, more than one fiducial mark can be used in the same radioactive surroundings, enabling the control unit to detect the absolute position of the system, or of the radioactive source, with respect to any of these fiducial marks or even with respect to several of them.

Thus, when the optical transducer is a visible-light camera, it is necessary to introduce the value of the dimensions, or of the size, of the fiducial mark in the control unit so that it can determine the distances between the system and the fiducial mark by means of the positioning instructions comprised in the memory and executed by the microcontroller.

In this case, in order to modify the position of the fiducial mark, the control unit records in the memory thereof the image wherein the fiducial mark is located in one of the limits of the field of vision of the optical transducer and relates it to all the previous images wherein the fiducial mark was visible. Subsequently, and maintaining the position of the system, the fiducial mark is transferred, for example, by the user, to the opposite limit of the field of vision of the optical transducer. The control unit considers this position as a position integral to the previous position, meaning, continuous with the location of the system and therefore it enables measurements to be taken continuously.

Instead, when the optical transducer is the contour camera, it provides the projected distances, and therefore it is not necessary for the dimensions of the fiducial mark to be known. It is possible to obtain the movement of the subsequent translations of the three-dimensional contour between each shot.

In this case, when the optical transducer is the contour camera, the visual reference is a recognisable object within the radioactive surroundings. In this manner, the control unit establishes a first recognisable object which, when due to the movement of the system, is located at the limit of the field of vision of the optical transducer, is replaced by a second recognisable object which is located at the opposite limit of the field of vision of the optical transducer. This operation enables the system to continue with the measurements in a continuous manner.

Additionally, the control unit memory comprises first sub-instructions which determine the sub-volumes:

$$X,Y,Z = Dx \cdot i + Xo, Dy \cdot j + Yo, Dz \cdot k + Zo$$

Wherein:
X, Y, Z: are the spatial coordinates of each sub-volume (cm), called LOC_X.
i, j, k: are integer values which identify the position of the voxel (three-dimensional point)
Dx, Dy, Dz: are integer values which represent the distance between the spatial coordinates between one voxel and the next.
Xo, Yo, Zo: are spatial coordinates, the initial ones of the voxel (cm).

Likewise, the control unit memory comprises second sub-instructions in the measurement instructions which measure the radiation for each sub-volume according to:

$$E = I \cdot CAL\_E + Eo$$

Wherein:
E is the energy factor (Ke),
I is the value of the signal measured in the detector (V),
CAL_E is the scale factor which relates the signal from the detector to the energy (Ke/V),
Eo is the value of the energy when the signal from the detector is 0 (Ke).

Also, the control unit memory comprises third sub-instructions in the measurement instructions which relate the sub-volumes to the energy factor in order to obtain the radioactive intensity factor (FI) of each sub-volume, by means of the following equation:

$$FI = E(LOC\_X, POSE\_D(t)) \cdot E((POSE\_D(t) - LOC\_X)^2) \cdot EFF\_C(E) \cdot FC$$

wherein:
E(LOC_X, POSE_D(t)) is the known efficiency factor of the gamma detector and which in this case depends on the orientation of the gamma radiation detector, and on the construction thereof,
E((POSE_D(t)−LOC_X)$^2$) is the efficiency factor relative to the distance which relates the relative distance between the position of the radioactive source to each sub-volume of the measurement,
EFF_C(E) is the factor which determines the efficiency of the gamma radiation detector of obtaining a signal for each photopeak of a certain energy, and
FC are additional factors referring to the gamma detector obtained by means of calibration.

A second aspect of the invention describes a method for the volumetric and isotopic identification of the spatial distribution of ionising radiation from point (or extensive) radioactive sources in radioactive surroundings, by means of the system described in the first aspect of the invention.

More specifically, the method comprises the following steps:
a) determining an initial location of the system in the radioactive surroundings,
b) establishing a measurement region within the field of vision of the optical transducer in the radioactive surroundings so as to include at least the visual reference,
c) obtaining, by means of the positioning instructions, an initial image of the measurement region of the radioactive surroundings, by means of the optical transducer and obtaining the initial orientation of the gamma radiation detector,
d) determining, by means of the positioning instructions, the initial absolute position of the system with respect to the visual reference,
e) modifying, at least once, the position of the system and performing the following steps for each series of positions after the initial position:
   I. taking, by means of the optical transducer and the positioning instructions, a series of images succeeding the initial image,
   II. performing, by means of the measurement instructions and the gamma radiation detector, radiation measurements in the radioactive surroundings,
   III. generating, by means of the control unit, a measurement volume in the image for projecting the radiation measurements by generating sub-volumes,
   IV. determining the three-dimensional coordinates which determine the sub-volumes and relating them to the measurements of the radioactive surroundings by means of the control unit,
   V. establishing, by means of the measurement instructions, a value greater than zero for each sub-volume and which in each series of positions will be increased (for each sub-volume) wherein radioactive intensity is detected and will be decreased (again, in each sub-volume) wherein radioactive intensity is not detected, and
   VI. characterising the ionising radiation according to the value of the electrical signal produced by the transducer according to the photopeaks in order to determine the isotope composition thereof.

The analysis of the location of the system in the radioactive surroundings is performed by means of the equation and parameters from the optical transducer.

More specifically, the measurement region of the radioactive surroundings is comprised in the field of vision of the optical transducer.

It should be noted that if the orientation of the gamma radiation detector is in the field of vision of the optical transducer, the control unit fuses both sets of information together, although the object of the invention is being able to quantify the radioactive surroundings with quality by means of the precise location of the sensor.

The detection field of the gamma radiation detector is also defined by a projective image. This means that each point of the image from the gamma radiation detector is in a line which contains all the possible points connecting the gamma radiation detector to the image. These cones or imaginary lines are known as epipolar, or "activity cones", depending on whether they refer to geometric aspects or to regions of contamination determined by said epipolar regions. In this manner, the detection field of the gamma radiation detector is transformed into a measurement volume by means of a mapping which comprises the movement and the orientation of the camera, wherein this position in space is called POSE(t) and is a value which depends on the time, since the position varies in time. It should be noted that the POSE(t) also comprises the POSE_X (t), which comprises the position of the system, and the POSE_D(t), which in turn comprises the orientation of the gamma radiation detector.

In this manner, the control unit considers the measurement volume as in a region of the space of the radioactive surroundings wherein it is possible for radioactive sources to exist, and pixelises, voxelises or discretises it, forming a three-dimensional matrix in the form of a sub-volumes comprised in a detection cone, wherein the control unit gives each sub-volume an initial value greater than 0, which will subsequently be increased in each sub-volume wherein radioactive intensity is detected and will be decreased in each sub-volume wherein radioactive intensity is not detected, enabling the volumetric identification of the spatial distribution of ionising radiation from radioactive sources in a quick and direct manner.

Meaning, as the system is moved and takes a series of measurements, the sub-volumes receiving a higher incidence of radioactivity within the measurement volume will have the value thereof gradually increased, facilitating the detection of the radioactive source in a dynamic manner and in real time.

More specifically, in order to perform said voxelisation, the control unit applies the following three-dimensional coordinates which determine the sub-volumes:

$$X,Y,Z=Dx \cdot i+Xo, Dy \cdot j+Yo, Dz \cdot k+Zo$$

Wherein:
X, Y, Z: are the spatial coordinates of each sub-volume (cm), called LOC_X.
i, j, k: are integer values which identify the position of the voxel
Dx, Dy, Dz: are integer values which represent the distance between the spatial coordinates between one voxel and the next.
Xo, Yo, Zo: are spatial coordinates, the initial ones of the voxel (cm).

Specifically, these coordinates are comprised in first sub-instructions of the measurement instructions of the control unit memory.

In this manner, the control unit measures the radiation for each sub-volume of the cone generated by the gamma radiation detector, and relates the radiation to each coordinate for each sub-volume of the cone. In this manner, the control unit considers the radiation as an energy factor which generally depends on the following equation.

$$E=I \cdot CAL\_E+Eo$$

Wherein:
E is the energy factor (Ke),
I is the value of the signal measured in the detector (V),
CAL_E is the scale factor which relates the signal from the detector to the energy (Ke/V),
Eo is the value of the energy when the signal from the detector is 0 (Ke).

Specifically, this energy equation is comprised in second sub-instructions of the measurement instructions of the control unit memory.

Finally, the control unit relates the sub-volumes to the energy factor in order to obtain the radioactive intensity factor (FI) of each sub-volume, by means of the following equation:

$$FI=E(LOC\_X,POSE\_D(t)) \cdot E((POSE\_D(t)-LOC\_X)^2) \cdot EFF\_C(E) \cdot FC$$

wherein:
E (LOC_X,POSE_D(t)) is the known efficiency factor of the gamma detector and which in this case depends on the orientation of the gamma radiation detector, and on the construction thereof.
E((POSE_D(t)−LOC_X)$^2$) is the efficiency factor relative to the distance which relates the relative distance between the position of the radioactive source to each sub-volume of the measurement.
EFF_C(E) is the factor which determines the efficiency of the gamma radiation detector in obtaining a signal for each photopeak of a certain energy.
FC are additional factors referring to the gamma detector obtained by means of calibration.

It should be noted that, although the invention has been described in radioactive surroundings, this system and method can be applied to any analysis wherein precise measurements of the intensity of a radioactive source used for other purposes are required, such as the medical and industrial sectors in the creation of isotopes, surveillance of misuse of materials, security surveillance.

The main advantage of this system and method is the possibility of enabling continuous movement of the system and taking this into account during each measurement of the radioactivity. By incorporating the information of the initial position of the system, and by having a real-time mechanism for knowledge about the orientation of the gamma radiation detector for each measurement, it is possible to integrate in the solution of the analysis of the radioactive surroundings, facilitating a continuous aggregation of data in real time.

Furthermore, during the acquisition of the measurements, the system enables it to be linked, by means of a communications port comprised in the control unit, to a visualisation device which enables the radioactive surroundings to be reproduced in two or three dimensions, sampling and exploring the most interesting regions of interest while in real time the distribution of the radiation is detected. In this manner, the system enables higher quality measurements to be obtained since the user, manually or automatically, can choose the subsequent positions of the system based on the previous radiation level reproduced in the display device.

Moreover, the system has advantages as far as the preparation of the radioactive surroundings to be characterised requiring minimum intervention by additional personnel for the incorporation of previously-calibrated sensors.

DESCRIPTION OF THE DRAWINGS

As a complement to the description provided herein, and for the purpose of helping to make the features of the invention more readily understandable, in accordance with a preferred practical exemplary embodiment thereof, said description is accompanied by a set of drawings which, by way of illustration and not limitation, represent the following.

PREFERRED EMBODIMENT OF THE INVENTION

Figure 1:
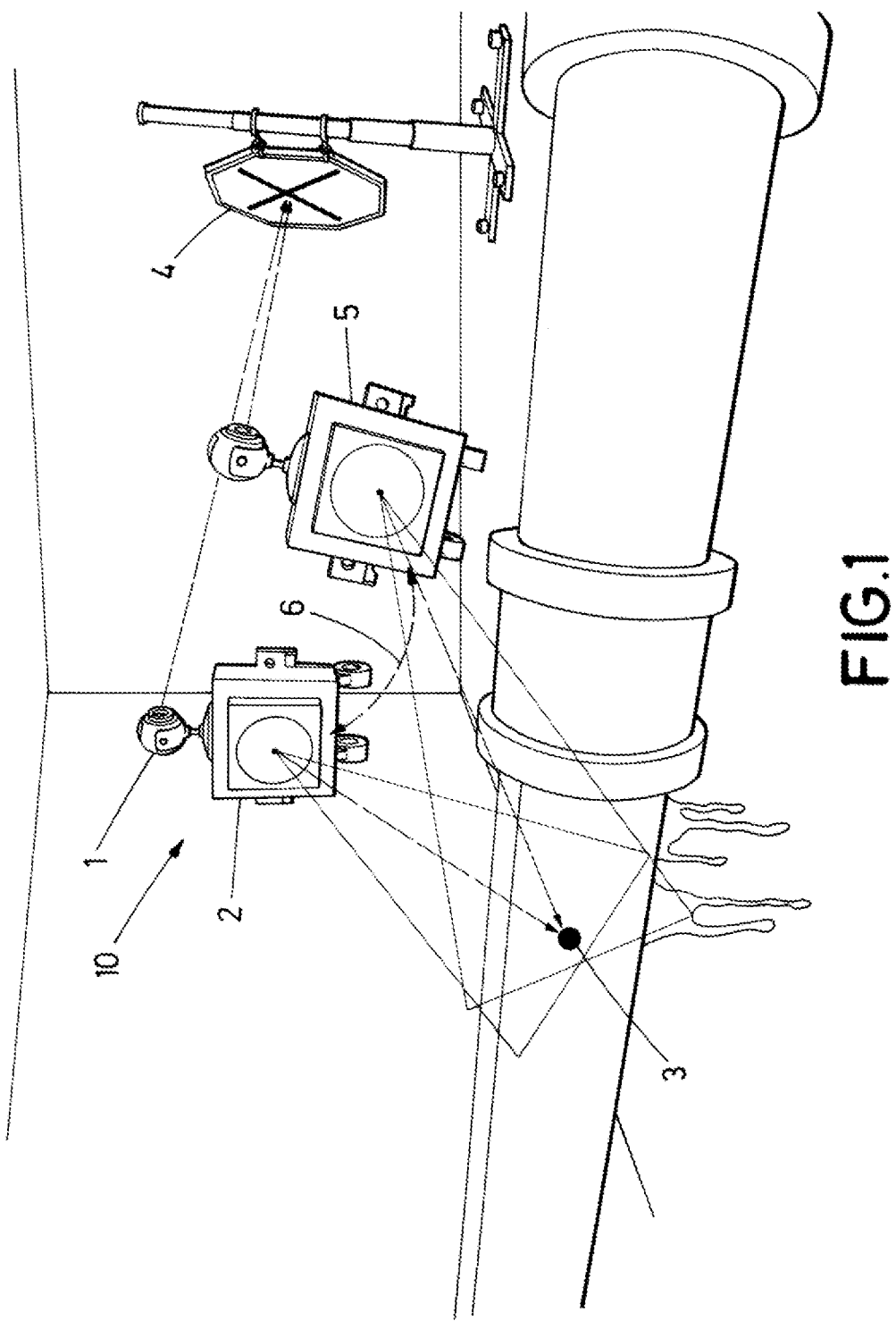
FIG. 1.—Shows a schematic view of a first preferred embodiment.

A first preferred embodiment of the invention, as shown in FIG. 1, is a system (10) for the volumetric and isotopic identification of point or extensive radioactive sources (3) in radioactive surroundings, wherein the system (10) comprises:
- a gamma radiation detector (2) for generating an electrical signal proportional to the energy of the ionising radiation from the radioactive source (3), and which comprises collimation mechanisms intended to obtain directional information from the radioactive surroundings (3),
- an optical transducer (1) such as a visible-light camera joined to the gamma radiation detector (2) for obtaining images or videos of the radioactive surroundings.

More specifically, the system (10) comprises:
- a control unit linked to the gamma radiation detector (2) and the optical transducer (1) comprising a microprocessor and a memory, wherein the microprocessor is linked to the memory which in turn comprises positioning instructions and measurement instructions for detecting, starting from the images of the radioactive surroundings, at least one visual reference such as a fiducial mark (4), arranged in a fixed position and at sight the visible-light camera, and for determining the origin direction of the ionising radiation by means of subsequent measurements quantifying the intensity of the ionising radiation.

Specifically, thanks to this fiducial mark (4) the control unit obtains the position and orientation of the system (10), with respect to the radioactive surroundings while the system (10) is moved.

Preferably, the system (10) will be positioned in different locations, the coordinates of which are defined by said positioning instructions. The next position of the optical transducer (1) is calculated by measuring the variation in position and orientation with respect to the same fiducial mark (4). This variation in position is rigidly transferred to the gamma radiation detector (2) since it is joined to the visible camera (1). The new orientations will determine the radioactive source (3) with precision. Subsequently, the radioactive surroundings are able to be measured by the movement of the system (10).

The measurements obtained by the gamma radiation detector (2) give information about the intensity of the radioactive source (3) since, by means of the control unit, the distance and the intrinsic energy efficiency of the gamma radiation detector (2) are known. Additionally, by means of the control unit, it is possible to calculate the distance between the system (10) and the radioactive source (3) since the intensity of the radioactivity is inversely proportional to the squared distance thereof from the radioactive source (3).

In this manner, the control unit, with at least two positions obtained from two different places, detects the three-dimensional position of the radioactive source (3) with respect to the fiducial mark (4) by means of the positioning instructions comprised in the control unit memory.

Said control unit, thanks to this data obtained from the gamma radiation detector (2) and the optical transducer (1), can reconstruct a three-dimensional image wherein it shows the spatial distribution of the ionising radiation.

Figure 2:
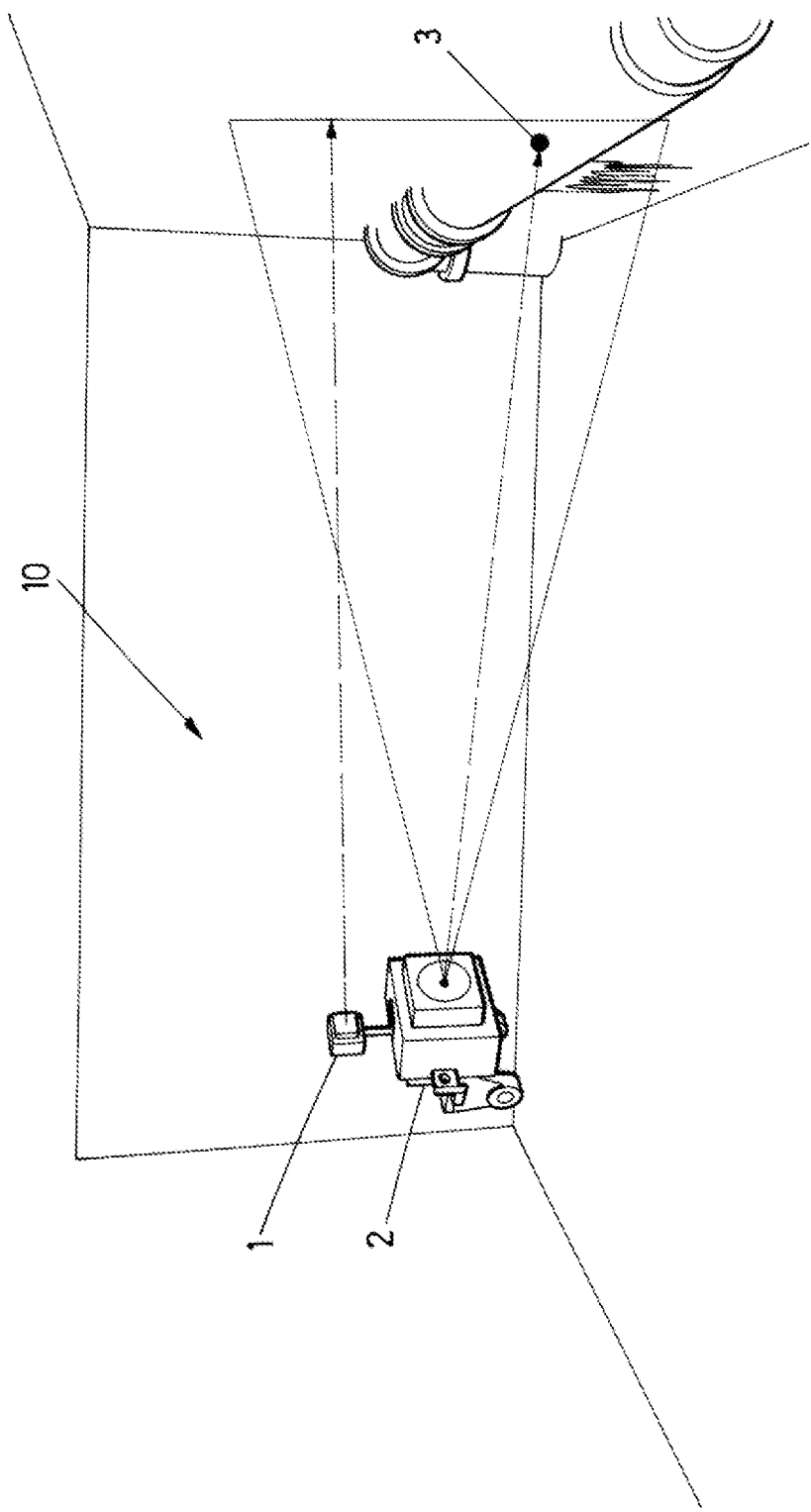
FIG. 2.—Shows a schematic view of a second preferred embodiment.

In a second preferred embodiment of the invention, as shown in FIG. 2, the system (10) comprises the optical transducer (1) which is a depth or contour camera joined to the gamma radiation detector (2), both of them being linked to the control unit. In this manner, the difference between the first preferred embodiment and the second preferred embodiment is the type of optical transducer (1).

This depth or contour camera is able to obtain the contour of the nearby objects and obtain three-dimensional information about the surface of neighboring objects or objects in the field of action of the contour camera. The complexity of obtaining the different locations is compensated by not requiring premanufactured fiducial marks (4), the contour of the surroundings being what acts as the fixed spatial reference.

In this second preferred embodiment, the very contour detected by the depth or contour camera is used as a visual reference, since the movement of the system (10) can be recalculated by identifying different objects. Additionally, the information from this contour can be combined with the information from the gamma camera (2) and once again determine the distance to the radioactive source (3) and the position thereof with respect to the system (10) by means of the positioning instructions comprised in the control unit memory.

The invention claimed is:

1. A system for the volumetric and isotopic identification of the spatial distribution of ionizing radiation from at least one point or extensive radioactive source in radioactive surroundings wherein the system comprises:
   a gamma radiation detector, for generating an electrical signal proportional to the energy of the ionizing radiation, and which comprises collimation mechanisms intended to obtain directional information from the radioactive surroundings, and
   an optical transducer linked to the gamma radiation detector for capturing images of the radioactive surroundings,
   wherein the gamma radiation detector is joined to the optical transducer, the optical transducer is a depth or contour camera, which provides projected distances, and the system comprises a control unit which in turn comprises:
   a microprocessor, and
   a memory linked to the microprocessor, and which comprises:
       positioning instructions for:
           defining an initial image of the radioactive surroundings captured by the optical transducer,
           detecting at least one visual reference in the initial image, wherein the visual reference is an object placed within the radioactive surroundings and within the field of the depth or contour camera in the initial position thereof;

determining the initial orientation of the gamma radiation detector with respect to said visual reference, detecting the absolute position of the system with respect to the visual reference of the initial image in a series of locations, starting from subsequent images after the initial image, and for determining the orientation of the gamma radiation detector for each location within the radioactive surroundings, and measurement instructions for:

performing measurements of the ionizing radiation, by means of the gamma radiation detector, in each location of the system within the radioactive surroundings, relating these measurements to the absolute position obtained by means of the positioning instructions, establishing the spatial distribution thereof in the radioactive surroundings forming a three-dimensional matrix with the shape of sub-volumes wherein each sub-volume region comprises a value proportional to the intensity of the radiation thereof, and characterizing the ionizing radiation according to the value of the electrical signal produced by the transducer according to the photopeaks in order to determine the isotope composition thereof.

2. The system of claim 1, wherein the collimation mechanisms comprise a structure with segmenters for detecting the direction of the ionizing radiation from the radioactive source in each location of the system.

3. The system of claim 1, wherein the control unit comprises detection instructions in the memory comprising collimation techniques such as Compton techniques for detecting the direction of the ionizing radiation from the radioactive source in each location of the system.

4. The system of claim 1, wherein the control unit memory comprises first sub-instructions which determine the sub-volumes:

$$X,Y,Z=Dx \cdot i+Xo, Dy \cdot j+Yo, Dz \cdot k+Zo$$

Wherein:

X, Y, Z: are the spatial coordinates of each sub-volume (cm), called LOC_X.

i, j, k: are integers which identify the position of the voxel

Dx, Dy, Dz: are integer values which represent the distance between the spatial coordinates between one voxel and the next.

Xo, Yo, Zo: are spatial coordinates, the initial ones of the voxel (cm).

5. The system of claim 4, wherein the control unit memory comprises second sub-instructions in the measurement instructions which measure the radiation for each sub-volume according to:

$$E=I \cdot CAL\_E+Eo$$

Wherein:

E is the energy factor (Ke),

I is the value of the signal measured in the detector (V),

CAL_E is the scale factor which relates the signal from the detector to the energy (Ke/V), Eo is the value of the energy when the signal from the detector is 0 (Ke).

6. The system of claim 5, wherein the control unit memory comprises third sub-instructions in the measurement instructions which relate the sub-volumes to the energy factor in order to obtain the radioactive intensity factor (FI) of each sub-volume, by means of the following equation:

$$FI=E(LOC\_X, POSE\_D(t)) \cdot E((POSE\_D(t)-LOC\_X)^2) \cdot EFF\_C(E) \cdot FC$$

Wherein:

E(LOC_X, POSE_D(t)) is the known efficiency factor of the gamma detector and which, in this case, depends on the orientation of the gamma radiation detector, and on the construction thereof, E((POSE_D(t)−LOC_X)$^2$) is the efficiency factor relative to the distance which relates the relative distance between the position of the radioactive source to each sub-volume of the measurement, EFF_C(E) is the factor which determines the efficiency of the gamma radiation detector in obtaining a signal for each photopeak energy, and FC are additional factors referring to the gamma detector obtained by means of calibration.

7. A method for the isotopic identification and characterization of the spatial distribution of ionizing radiation from a radioactive point, or extensive, source or sources in radioactive surroundings, which uses the system of claim 1, wherein it comprises the following steps:

a) determining an initial location of the system in the radioactive surroundings, b) establishing a measurement region within the field of vision of the depth or contour camera in the radioactive surroundings identifying at least one visual reference, which is an object placed within the radioactive surroundings and within the field of the depth or contour camera in the initial position thereof;

c) obtaining, by means of the positioning instructions, an initial image of the measurement region of the radioactive surroundings, by means of the depth or contour camera and obtaining the initial orientation of the gamma radiation detector, d) determining, by means of the positioning instructions, the initial absolute position of the system with respect to the visual reference, e) modifying, at least once, the position of the system and performing the following steps for each series of positions after the initial position:

i. taking, by means of the depth or contour camera and the positioning instructions, a series of images succeeding the initial image, ii. performing, by means of the measurement instructions and the gamma radiation detector, radiation measurements in the radioactive surroundings, iii. generating, by means of the control unit, a measurement volume in the image for projecting the radiation measurements by generating sub-volumes, iv. determining the three-dimensional coordinates which determine the sub-volumes and relating them to the measurements of the radioactive surroundings by means of the control unit, v. establishing, by means of the measurement instructions, a value greater than zero for each sub-volume and which in each succession of positions will be increased in each sub-volume wherein radioactive intensity is detected and will be decreased in each sub-volume wherein radioactive intensity is not detected, and vi. characterizing the ionizing radiation according to the value of the electrical signal produced by the transducer according to the photopeaks in order to determine the isotope composition thereof.

8. The method of claim 7, wherein the control unit memory comprises first sub-instructions which determine the sub-volumes:

$$X,Y,Z = Dx \cdot i + Xo, Dy \cdot j + Yo, Dz \cdot k + Zo$$

Wherein:
X, Y, Z: are the spatial coordinates of each sub-volume (cm), called LOC_X.
i, j, k: are integers which identify the position of the voxel
Dx, Dy, Dz: are integer values which represent the distance between the spatial coordinates between one voxel and the next.
Xo, Yo, Zo: are spatial coordinates, the initial ones of the voxel (cm).

9. The method of claim 8, wherein the control unit memory comprises second sub-instructions in the measurement instructions which measure the radiation for each sub-volume according to:

$$E = I \cdot CAL\_E + Eo$$

Wherein:
E is the energy factor (Ke),
I is the value of the signal measured in the detector (V),
CAL_E is the scale factor which relates the signal from the detector to the energy (Ke/V),
Eo is the value of the energy when the signal from the detector is 0 (Ke).

10. The method of claim 9, wherein the control unit memory comprises third sub-instructions in the measurement instructions which relate the sub-volumes to the energy factor in order to obtain the radioactive intensity factor (FI) of each sub-volume, by means of the following equation:

$$FI = E(LOC\_X, POSE\_D(t)) \cdot E((POSE\_D(t) - LOC\_X)^2) \cdot EFF\_C(E) \cdot FC$$

Wherein:
E(LOC_X, POSE_D(t)) is the known efficiency factor of the gamma detector and which, in this case, depends on the orientation of the gamma radiation detector (2), and on the construction thereof,
E((POSE_D(t)−LOC_X)$^2$) is the efficiency factor relative to the distance which relates the relative distance between the position of the radioactive source (3) to each sub-volume of the measurement,
EFF_C(E) is the factor which determines the efficiency of the gamma radiation detector in obtaining a signal for each photopeak of a certain energy, and
FC are additional factors referring to the gamma detector obtained by means of calibration.

* * * * *